United States Patent

Parthasarathy et al.

[15] 3,666,804

[45] May 30, 1972

[54] OXIDATION PROCESS

[72] Inventors: R. Parthasarathy, Takoma Park; Frank G. Ciapetta, Silver Spring, both of Md.

[73] Assignee: W. R. Grace & Co., New York, N.Y.

[22] Filed: Oct. 26, 1966

[21] Appl. No.: 589,510

[52] U.S. Cl. ..............260/530 N, 260/533 N, 260/604 R, 260/606
[51] Int. Cl. ..............................C07c 51/26, C07c 53/08
[58] Field of Search ..........................260/530 U, 533 U, 604

[56] References Cited

UNITED STATES PATENTS

| | | | |
|---|---|---|---|
| 3,395,178 | 7/1968 | Callahan | 260/530 U |
| 2,881,212 | 4/1959 | Idol et al. | 260/530 U |
| 3,293,290 | 12/1966 | Flint et al. | 260/533 |
| 3,423,455 | 1/1969 | Dobves et al. | 260/533 |
| 2,941,007 | 6/1960 | Callahan et al. | 260/604 |
| 3,427,343 | 2/1969 | Callahan et al. | 260/604 |
| 3,423,329 | 1/1969 | Gruber | 260/604 |

FOREIGN PATENTS OR APPLICATIONS 903,034  8/1962  Great Britain..........................260/533

*Primary Examiner*—Lorraine A. Weinberger
*Assistant Examiner*—R. S. Weissberg
*Attorney*—Joseph P. Nigon and Kenneth E. Prince

[57] ABSTRACT

Methods of oxidizing alpha unsaturated aldehydes to the corresponding alpha unsaturated monocarboxylic acids are disclosed. The methods are characterized in one aspect by the use of a molybdenum phosphate catalyst. Methods of producing the alpha unsaturated aldehydes starting material from the corresponding unsaturated olefins are also disclosed.

10 Claims, No Drawings

OXIDATION PROCESS

This invention relates to an improved process for the production of unsaturated oxygen containing compounds comprising monocarboxylic acids. In one particular embodiment, the invention relates to an improved process for the direct vapor oxidation of acrolein and/or methacrolein to acrylic acid and/or methacrylic acid respectively.

Unsaturated aliphatic monocarboxylic acids such as acrylic acid and methacrylic acid, for example, are valuable starting and intermediate materials for a whole series of reactions because of their highly reactive nature. Their highly reactive nature also makes these materials difficult to prepare and contributes to the problems encountered in large scale production of these acids.

The prior art processes for the production of acrylic acid and/or methacrylic acid have been based on operational procedures which are complex and costly and which do not lend themselves to economical large scale operation. These procedures generally comprise liquid phase operation which of necessity require relatively costly equipment and are very difficult to control.

It has been recognized for sometime that a potential source of unsaturated acids is the corresponding olefins. However, large scale production of the acids directly from this group has not followed because of the relatively low yield and costly operational steps involved in the available processes.

The prior art processes generally result in the generation of a mixed product that contains varying amounts of unsaturated aldehydes along with small amounts of unsaturated monocarboxylic acids. These processes were frequently directed to separation and utilization of the aldehydes in the subsequent preparation of monocarboxylic acids. Procedures of this type were obviously cumbersome and commercially unattractive.

We have found that the selective oxidation of acrolein to acrylic acid and/or methacrolein to methacrylic acid can be effected and high yields of acrylic acid and methacrylic acid can be recovered by the vapor phase reaction in a single pass using molybdenum phosphate as the catalyst.

In this system, the aldehyde, in admixture with air and steam, is passed through the reactor containing the catalyst for conversion of the aldehyde to acid. Although our process is specific to the use of molybdenum phosphate catalyst for the preparation of the acid, it is also useful as a catalyst for the second stage of a two stage system for the oxidation of propylene to acrylic acid or of isobutylene to methacrylic acid. For example, one suitable two-step process for the conversion of alpha olefinic hydrocarbons containing fewer than eight carbon atoms in the molecule to a reactant mixture containing substantial amounts of alpha unsaturated monocarboxylic acids corresponding to said olefinic hydrocarbons comprises reacting said olefins in the vapor phase with oxygen in a two-stage sequential reactor system in the presence of a catalyst selected from the group consisting of bismuth molybdate, rare earth promoted bismuth molybdate or Group VIII metal promoted bismuth molybdate in the first stage and a catalyst consisting essentially of a molybdenum phosphate having a molybdenum trioxide to phosphorous pentoxide ratio of 1:1 to 1:5 in the second stage.

The novelty for this invention resides in the use of "molybdenum phosphate" catalyst for the conversion of acrolein to acrylic acid. The "molybdenum phosphate" suitable for use in our process has an $MoO_3$ to $P_2O_5$ ratio in the range of 1:1 to 1:5. The preferred ratio is in the range of 1:1 to 1:3. We have also found that the acrylic acid selectivity is greatly increased if the catalyst is calcined at a temperature of about 1,200° F.

The catalyst component may be supported on any suitable support with an average pore size within 100 Angstroms such as, for example, alumina, silica gel, etc. The preferred support is silica gel having a pore volume of about 0.1 cc./g. to 1 cc./g. and surface area of about 10 to 150 $M^2/g$. The compositions with varying ratios of $MoO_3$ to $P_2O_5$ are conveniently prepared from ammonium molybdate and ammonium acid phosphate or by the use of phosphomolybdic and phosphoric acids. Commercially available molybdenum phosphate is also a suitable starting material for the preparation of these active catalysts.

One suitable method of preparing a catalyst having an $MoO_3$ to $P_2O_5$ ratio of 1:1 comprises mixing ammonium molybdate and ammonium acid phosphate with a silica sol, gelling the resulting mixture and drying and calcining the resulting product. The product having a $MoO_3$ to $P_2O_5$ ratio of 1 to 1.5 can be conveniently prepared by dissolving commercially available molybdenum phosphate in deionized water and adding phosphomolybdic acid. The mixture is then added to a silica sol and the pH adjusted. The gel is then dried and the product calcined to prepare the catalyst.

The final form of the catalyst is unimportant and may be manufactured in the form of pellets or in the form of finely divided particles by conventional spray drying techniques. Extrusion or pellets may be used to prepare our catalyst in the desired form. Furthermore, the novelty of this invention is not limited to molybdenum phosphate alone. Tungsten phosphates of varying ratios of $MoO_3$ to $P_2O_5$ are also envisaged. The catalyst may also be used in conjunction with catalytically inert supports such as silicon carbide or like materials.

The oxygen for use in the process may be recovered from the fractionation of air but may be a more dilute oxygen containing gas. A suitable source of oxygen comprises, for example, molecular oxygen alone or as a mixture with an inert diluent gas such as nitrogen. Air may be used as the source of the molecular oxygen reactant. The oxygen containing gas may be admixed with the aldehyde charge of the system before it is introduced into the reaction zone or it may be introduced in part or in its entirety directly into the reaction zone at one or more points in the reaction zone. The oxygen containing gas is passed through the system in conjunction with steam. The ratio of oxygen to steam in the gas conversion mixture is from 1:2 to 1:20, the preferred ratio being 1:3 to 1:15. The amount of oxygen fed to the reactor based on 1 mole of unsaturated aldehyde should be in the range of 0.25 moles to 5 moles. The best results are obtained when the mole ratio of oxygen to unsaturated aldehyde is greater than 0.25 to 1 and less than about 2 to 1.

The process can be operated at any convenient pressure. Since no advantage is derived from operation at pressures other than atmospheric, operation at atmospheric pressure is obviously preferred.

The process can be conducted at temperatures in the range of about 600° to about 1,000° F. The best results are obtained when the process is carried out at temperatures of 600° to 900° F.

In this system, the aldehyde is present in an amount equal to about 2:20 volume percent, preferably about 4:12 volume percent in a reactant mixture. The ratio of oxygen to aldehyde is maintained at a range of 0.5 to 1 to 5 to 1. The preferred oxygen to aldehyde ratio is 1:1 to 2:1. The steam to aldehyde ratio is in the range of 2:1 to 20:1, preferably 4:1 to 15:1. The reaction is carried out for a period of time such that the reactants contact the catalyst for periods of 1 to 10 seconds, preferably about 3 to 4 seconds. The contact time is defined as the reciprocal of the gas hourly space velocity at standard conditions.

As pointed out previously, the essence of the present invention is the conversion of acrolein and methacrolein from acrylic acid to methacrylic acid by the catalytic vapor phase oxidation in a single pass using molybdenum phosphate as a catalyst.

The invention is further illustrated by the following specific but non-limiting examples.

EXAMPLE I

This example describes one of the alternate methods of preparing the catalyst suitable for the conversion of acrolein.

A total of 61.5 grams of ammonium molybdate $(NH_4)_6 Mo_7O_{24} \cdot 4H_2O)$ in 100 cc. of deionized water was added to 210 grams of a commercially available silica sol purchased from the DuPont Company. This quantity of silica sol contains 100 grams of $SiO_2$. A change (93 grams) of ammonium acid phosphate ($(NH_4)_2HPO_4$) was dissolved in 125 ml. of deionized water, heated to 70° C. and added to the above mixture. The pH of the resulting mixture was 7.1. The pH was adjusted to 7.3 by the addition of 16 ml. of a 1:1 ammonium hydroxide solution. A firm gel formed which was dried for 16 hours at 220° F. and calcined for 16 hours at 1,000° F. and for 16 hours at 1,200° F. The calcined product was cooled and the particles of the 6 to 25 mesh range were separated. A total of 163.9 grams of catalyst was recovered from this run. The product contained 50 percent of a molybdenum phosphate (having a $MoO_3$ to $P_2O_5$ ratio of 1:1) and 50 percent $SiO_2$.

EXAMPLE II

This example describes a method of preparing the catalyst wherein the $MoO_3$ to $P_2O_5$ ratio was changed to a 3:1.

A total of 69.5 grams of ammonia molybdate was dissolved in 100 ml. of deionized water and 158 grams (75 grams $SiO_2$) of a commercially available silica sol purchased from the DuPont Company was added. A total of 34.4 grams of ammonium acid phosphate was dissolved in 50 cc. of deionized water, heated to 70° C. and added to the silica ammonium molybdate mixture. Gelation occurred without the addition of ammonium hydroxide. The product was dried for 16 hours at 220° F. and calcined for 16 hours at 1,000° F. The particles in the 6 to 25 mesh range were separated and used as the catalyst. A total of 140.6 grams of the product was recovered. The $MoO_3$ to $P_2O_5$ ratio of the catalyst was 3:1. The product contained 50 percent active components and 50 percent $SiO_2$.

EXAMPLE III

This example illustrates another method of preparing the molybdenum phosphate catalyst of our invention. A total of 36.3 grams of commercially available molybdenum phosphate was dissolved in a 100 ml. of deionized water and 25.6 grams of phosphomolybdic acid was added. This mixture was added to 222 grams (105 grams $SiO_2$) of a silica sol sold by the DuPont Company. The pH of the mixture was 0.35. The mixture was heated to 150° F. and the pH adjusted to 6.2 by the addition of a 1:1 solution of ammonium hydroxide. A gel formed which was dried for 16 hours at 220° F. and calcined for 16 hours at 1,000° F. The particles in the 6 to 25 mesh size range were separated and used as the catalyst. A total of 141 grams of the product was recovered from this separation. The $MoO_3$ to $P_2O_5$ ratio in this preparation was 1 to 1.5. The catalyst contained 30 percent active ingredients and 70 percent silica.

EXAMPLE IV

The efficiency of this catalyst was demonstrated by charging 50 ml. of each of the catalyst preparations to an aluminized stainless steel reactor, and continuously contacting the catalyst with a feed mixture containing 5 percent acrolein, 25 percent air and 70 percent steam at atmospheric pressure. The contact time was 3.6 seconds, the temperature was varied in this series of runs. The results of this series of runs is set out in the table below:

TABLE I

| Catalyst | $MoO_3/P_2O_5$ ratio | Ave. bed temp., °F. | Percent acrolein converted | Selectivity of Acrolein conversion | | | |
|---|---|---|---|---|---|---|---|
| | | | | Acrylic acid | Acetic acid | $CH_3CHO$ | Other products* |
| 50% $MoO_3$:$P_2O_5$ on $SiO_2$ | 1:1 | 814 | 83 | 75.5 | 13.8 | 1.0 | 9.2 |
| 30% $2MoO_3$:$3P_2O_5$ on $SiO_2$ | 1:1.5 | 784 | 71.5 | 75.3 | 9.0 | 2.0 | 12.4 |
| 20% $MoO_3$:$3P_2O_5$ on $SiO_2$ | 3:1 | 861 | 75 | 77.7 | 15.7 | 2.2 | 4.2 |

*CO, $CO_2$ and formaldehyde.

It is obvious from review of the data that conversion of greater than 70 percent can be effected using the catalyst of this invention.

EXAMPLE V

This example illustrates the efficiency of the molybdenum phosphate catalyst in the second stage of a two-stage system for the direct oxidation of propylene to acrylic acid in high yield. Here, propylene admixed with air and steam in amounts to give a feed mixture containing 5 percent propylene, 50 percent air and 45 percent steam, was passed over a samarium promoted bismuth molybdate catalyst (which is described in our copending case) maintained at 905° F. in the first stage of the two-stage system. The acrolein rich effluent was then rapidly quenched to 250° F. and directly passed, without intermediate product separation, into the second reactor containing a molybdenum phosphate catalyst (having a $MoO_3$ to $P_2O_5$ ratio of 1 to 1.5) maintained at 775° F. An overall propylene conversion of 92 percent was obtained giving 48 percent yield of acrylic acid based on converted propylene.

Obviously many modifications and variations of the invention may be made without departing from the essence and scope thereof.

What is claimed is:

1. A process for the conversion of alpha unsaturated aldehydes containing fewer than eight carbon atoms in the molecule to a reactant mixture containing substantial amounts of alpha unsaturated monocarboxylic acids corresponding to said aldehydes which comprises reacting said aldehydes in the vapor phase with an oxygen containing gas at a temperature of 700° to 900° F. in a bed of a catalyst consisting essentially of a molybdenum phosphate catalyst having a molybdenum trioxide to phosphorus pentoxide ratio of 1:1 to 1:5.

2. The process of claim 1 wherein the reaction is carried out as a second stage of a two-stage process having a first stage and said second stage.

3. The process according to claim 1 wherein the oxygen containing gas is air.

4. The process according to claim 2 wherein the oxygen containing gas is admixed with steam in a ratio of 1:2 to 1:20 and a catalyst consisting essentially of a molybdenum phosphate having a molybdenum trioxide to phosphorus pentoxide ratio of 1:1 to 1:5 in the second stage.

5. The process according to claim 1 wherein the aldehyde is selected from the group consisting of acrolein and methacrolein.

6. The process according to claim 1 wherein the catalyst contains 10 to 90 percent active ingredients and a $SiO_2$ diluent.

7. A process for the conversion of alpha olefinic hydrocarbons containing fewer than eight carbon atoms in the molecule to a reactant mixture containing substantial amounts of alpha unsaturated monocarboxylic acids corresponding to said olefinic hydrocarbons which comprises reacting said olefins in the vapor phase with oxygen in a two-stage sequential reactor system in the presence of a catalyst consisting essentially of rare earth promoted bismuth molybdate in the first stage and a catalyst consisting essentially of a molybdenum phosphate having a molybdenum trioxide to phosphorus pentoxide ratio of 1:1 to 1:5 in the second stage.

8. The process according to claim 2 wherein the feed to said first stage is selected from the group consisting of propylene and isobutylene and the oxygen containing gas is air.

9. The process according to claim 2 wherein the first stage of the reactor is operated at a temperature of 700° to 950° F. and the second stage at a temperature of 700° to 900° F. and the feed is the olefin, air and steam.

10. The process according to claim 2 wherein the feed to said first stage is a mixture of propylene, air and steam and the ratio of oxygen to propylene is in the range of 0.5:1 to 5:1.

* * * * *